United States Patent [19]

Rice et al.

[11] Patent Number: 5,124,956
[45] Date of Patent: Jun. 23, 1992

[54] GEOPHONE WITH DEPTH SENSITIVE SPIKES

[75] Inventors: James A. Rice; Louis M. Houston, both of Houston; Roel Arevalo, Meadows, all of Tex.

[73] Assignee: Exxon Production Research Company, Houston, Tex.

[21] Appl. No.: 642,706

[22] Filed: Jan. 17, 1991

Related U.S. Application Data

[63] Continuation of Ser. No. 521,908, May 11, 1990, abandoned.

[51] Int. Cl.$^5$ .............................................. H04R 15/00
[52] U.S. Cl. .................................... 367/178; 181/122; 181/401
[58] Field of Search .............................. 181/122, 401; 367/178-188; 411/439, 446, 480, 483, 484, 493, 494, 498, 499

[56] References Cited

U.S. PATENT DOCUMENTS

| 63,738 | 4/1867 | Merlett | 411/493 X |
|---|---|---|---|
| 1,131,149 | 3/1915 | Martin | 411/493 |
| 1,767,242 | 6/1930 | Keifer | 367/178 |
| 1,951,358 | 3/1934 | Hayes | 367/178 |
| 2,074,161 | 3/1937 | Bills | 367/178 |
| 2,786,987 | 3/1957 | Jolly | 181/102 |
| 3,034,595 | 5/1962 | Thompson | 181/401 X |
| 3,119,978 | 1/1964 | Sears | 367/178 |
| 3,688,251 | 8/1972 | Morris | 367/178 |
| 3,858,168 | 12/1974 | Barr, Jr. et al. | 367/178 |
| 3,921,259 | 11/1975 | Brumlik | 411/446 X |
| 3,930,218 | 12/1975 | Hall, Jr. | 367/188 |
| 3,984,804 | 10/1976 | Herring et al. | 181/402 |
| 3,993,859 | 11/1976 | McNeel | 367/178 |
| 4,122,433 | 10/1978 | McNeel | 367/178 |
| 4,300,220 | 11/1981 | Goff et al. | 367/188 |
| 4,310,066 | 1/1982 | Won | 181/401 X |
| 4,583,207 | 4/1986 | Greer, Jr. | 367/178 |
| 4,594,698 | 6/1986 | Hefer | 367/188 |
| 4,599,713 | 7/1986 | Rudaz | 367/178 |
| 4,811,311 | 3/1989 | Woodall, Jr. et al. | 367/178 |
| 4,867,096 | 9/1989 | Cole | 181/401 |

FOREIGN PATENT DOCUMENTS

| 171669 | 8/1916 | Canada | 411/493 |
|---|---|---|---|
| 0717685 | 2/1980 | U.S.S.R. | 181/102 |
| 1043576 | 9/1983 | U.S.S.R. | 367/188 |
| 1402985 | 6/1988 | U.S.S.R. | 181/122 |
| 5726 | of 1892 | United Kingdom | 411/494 |

OTHER PUBLICATIONS

"Geophone Ground Coupling", C. E. Krohn, Geophysics, Apr. 1985.
"Geophone Differencing to Attenuate Horizontally Propagating Noise", R. W. Knapp, Sep. 1986.

Primary Examiner—Brian S. Steinberger
Attorney, Agent, or Firm—Vaden, Eickenroth, Thompson & Boulware

[57] ABSTRACT

A geophone configuration is disclosed that includes an elongated extension or spike that couples with the soil in the hole made by the spike in the region near the end of the spike without hard or firm coupling with the soil above that region. A bow spring or drill bit larger in diameter than the diameter of the spike can be used for achieving predominant contact for the coupled region compared to soil opposite the remainder of the spike. Alternately, a weighted tip can be employed to achieve relative superior coupling by weight compared with the less heavy region of the spike above such weighted tip.

19 Claims, 2 Drawing Sheets

GEOPHONE WITH DEPTH SENSITIVE SPIKES

This application is a continuation of application Ser. No. 07/521,908, filed May 11, 1990, now abandoned.

BACKGROUND OF THE INVENTION

1. Field of the Invention

This invention pertains to acoustical seismic detectors or geophones and more particularly to enhancing the efficiency of reception by geophones using a specially designed extension or spike in connection therewith.

2. Description of the Prior Art

The acoustical seismic detectors or receivers used for land exploration seismic surveys are known as geophones. The term "acoustic seismic detector" is a generic term that for purposes herein, applies to a receiver suitable for sensing elastic motion in the lithology, including the sensing of compressional and shear wave particle motion. Such geophones are disposed in accordance with the requirements of a particular survey at spaced intervals for reception of seismic source signals as they arrive through the air, directly from the source or sources along the surface of the ground and as refracted and reflected by the lithological character of the subsurface. The received data in the form of acoustical energy or elastic motion is converted to corresponding electrical signals by the element or elements in each geophone for transmission and recording with related data from the source(s) and from other geophones. Finally, the data is processed and interpreted or analyzed to yield information about the subsurface character of the lithology. Typically, this is done to determine if there might be hydrocarbon deposits and, if so, at what depths and in what quantity.

Although surveys vary tremendously in their requirements, it is not uncommon for a particular survey to require dozens of geophones. Further, after the readings are recorded for a first location, the geophones are relocated for taking numerous subsequent readings. It is normal practice in approximately 95 percent of the time that each individual geophone is disposed in its position at or very near the surface, although it is important to obtain close coupling with the ground. This coupling can be accomplished with the use of short extensions or feet on the bottom of the housing, there usually being more than one, that embed from a fraction of an inch up to 3 inches into the earth.

It may be noted that geophones come in a variety of forms. Basically, however, geophones include one or more transducer elements that are primarily sensitive to vertical acoustic motion detection, or to horizontal acoustic motion detection, or in some cases, both.

In some locations, it may be desirable to bury the geophones in order to couple them to more competent material than is found at the surface. Digging holes to plant subsurface geophones is expensive, time consuming and sometimes difficult. Moreover, refilling the holes is likewise expensive and time consuming. Holes left unfilled can be hazardous.

Therefore, it is a feature of the present invention to provide an improved geophone with an attachment suitable for coupling with lithology at a location underneath the earth's surface without having to dig a hole for the geophone.

It is another feature of the present invention to provide an improved extension for a geophone in the form of a specially constructed spike for attaching to the lithology at a location underneath the earth's surface without also attaching to the lithology at intermediate locations between the deep end of the spike and the top end of the spike where the geophone is attached.

SUMMARY OF THE INVENTION

The geophone in accordance with the present invention includes a housing suitable for attaching to a deep-coupling, elongated spike. The spike is typically in the range between 2 and 3 feet long, although shorter and longer lengths can be used when required. The bottom of the housing includes a releasable connecting part and the top of the spike includes a mating releasable connecting part. The lower end of the spike includes a lower segment that acoustically couples to the ground when the spike is driven into position while leaving the spike substantially uncoupled from the ground above that lower segment.

A preferred embodiment of a spike in accordance with the present invention includes one or more stiff bow springs. As the spike is driven into the ground, the bow spring(s) gouges out a hole that is slightly larger than the shaft size of the spike. Thus, in its final position the bow spring(s) urges radially outwardly against the side of the hole along an area opposite the bow spring(s). However, the upper part of the spike above the bow spring(s) does not bear against the hole and is, therefore, not substantially coupled therewith.

Another preferred embodiment of a spike according to the present invention includes a drill bit type of head that is somewhat larger in diameter than the diameter of the spike. This spike embodiment is driven in by rotating the spike, such as by an auger drive. Again the hole is made larger than the shaft of the spike, but the head burrows into hard contact with the soil at the bottom of the hole.

Yet another embodiment of the invention involves a spike that is steel tipped and lead filled or otherwise heavily weighted at the bottom compared with the upper portion of the spike. Such a spike, except for the tip, is made of materials much lighter than the tip. Aluminum is generally used. This spike is particularly useful in sandy soils, which allow the spike to be driven in to its final position wherein the soil at the bottom is not materially attached or secured to the surface of the spike any harder than along the upper part of the spike. However, since the bottom portion is so much heavier, the effective coupling is much greater at the lower portion than the upper portion. That is, elastic seismic vibrations or acoustical waves have a much greater momentum effect on the bottom than elsewhere. Thus, the bottom portion of the spike determines the effective depth at which the seismic signals are detected, which is the same result that occurs for the first and second embodiments of the invention described above. Attached to the top of the spike is a coupler that is included to make it easier to handle than the top of a small pipe, which conventionally is only ¼ inch in diameter.

The spikes of the first and third embodiments are driven in by pounding. The second embodiment type is rotated in. In order to protect the top of the coupler and spike against pounding, a block is used. This block is attached to the coupler in place of the geophone during the driving. Such a block can readily accept the blows from a manual or mechanical driver. A block is also used with the drill bit embodiment and is shaped so that it can be grasped by the auger or other drill bit rotation mechanism. When the top of a spike is somewhat below the level of the ground and the coupler actually is somewhat embedded, the block is removed and the geophone is attached where the block was.

Spikes for the bow spring and weighted tip embodiments are removed from the ground by using the coupler or other part that permits a removal tool to lift up on the spike in the manner of a crow bar (or to unscrew the spike while lifting for the drill bit embodiment). The small hole that is left in the earth does not have to be filled in since it is of such a small diameter. Spikes on the order of $\frac{1}{4}''$ to $\frac{1}{2}''$ in diameter are the most common sizes so the hole that is left is only slightly larger than the spike. A hole of such size quickly fills in itself and even before filling in is no larger than a great number of irregularities encountered in the field and, therefore, is not considered very hazardous.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof that are illustrated in the drawings, which form a part of this specification. It is to be noted, however, that the appended drawings illustrate only typical preferred embodiments of the invention and are not to be considered limiting of its scope as the invention may admit to other equally effective embodiments.

IN THE DRAWINGS

Figure 1:
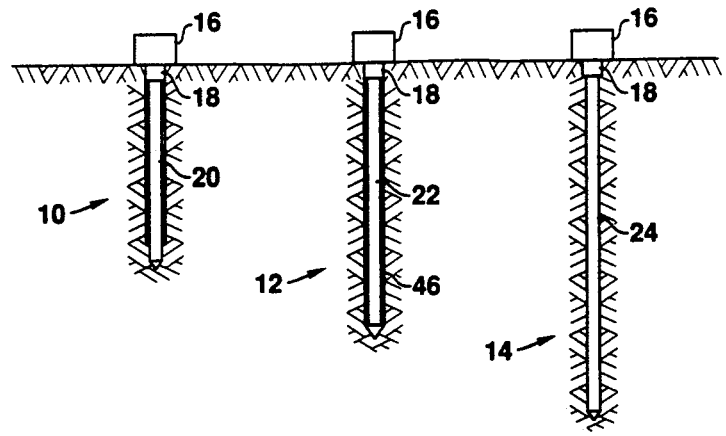

FIG. 1 is a schematic representation of three different preferred embodiments of the present invention shown in situ.

Figure 2:
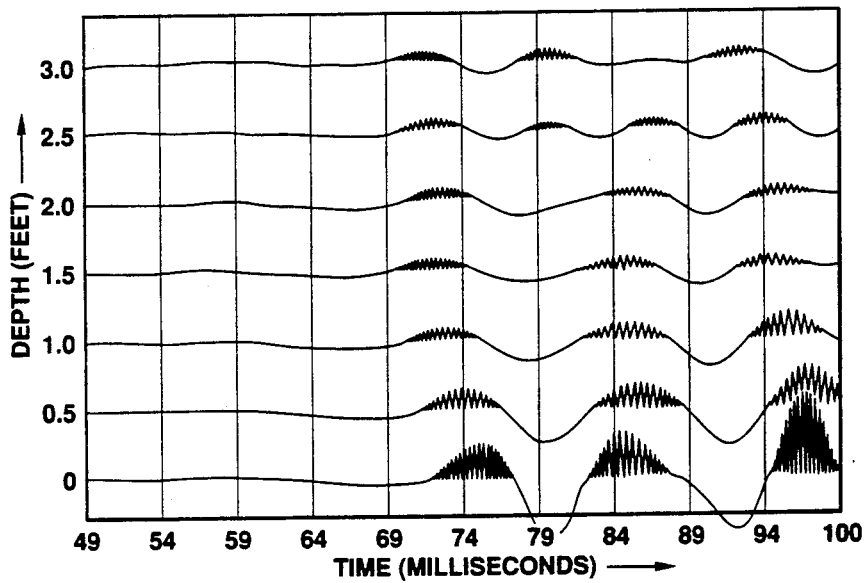

FIG. 2 is a response waveform of first arrivals for geophones buried at various depths in accordance with the prior art.

Figure 3:
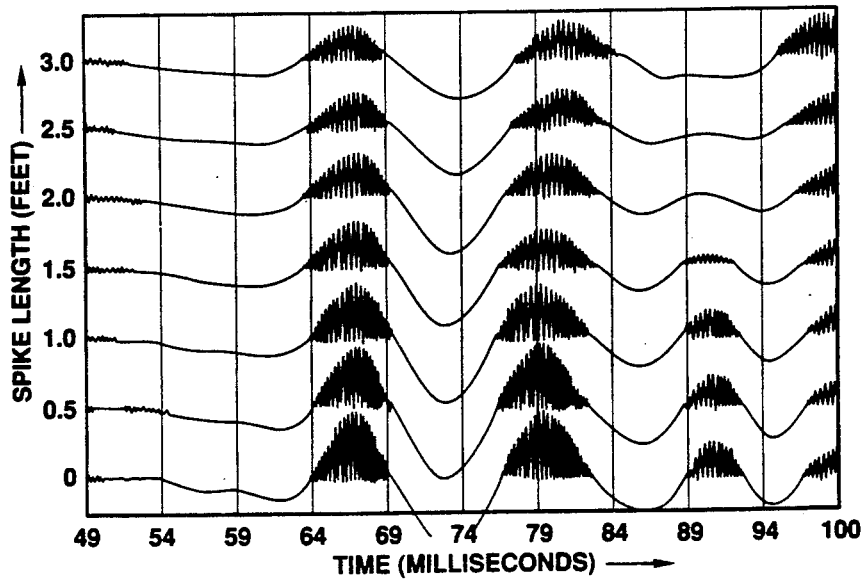

FIG. 3 is a response waveform of first arrivals for geophones connected to spikes of corresponding length to the respective buried depths of the FIG. 2 geophones, thus illustrating performance in accordance with the present invention.

Figure 4:
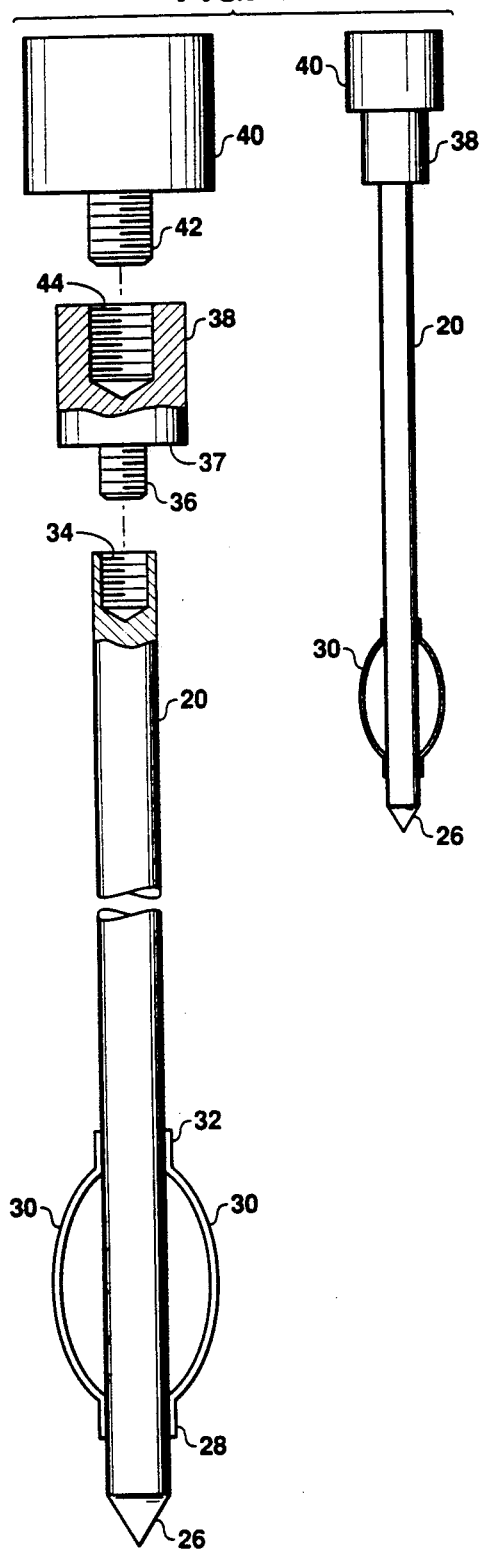

FIG. 4 is a representation of a geophone and spike combination in accordance with a first embodiment of the present invention.

Figure 5:
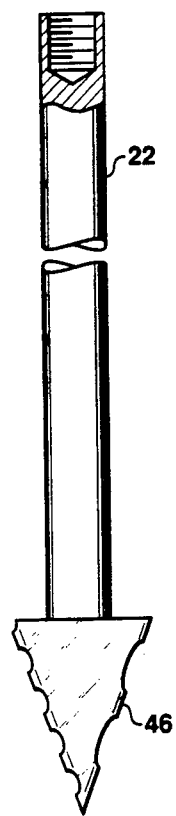

FIG. 5 is a representation of a geophone and spike combination in accordance with a second embodiment of the present invention.

Figure 6:
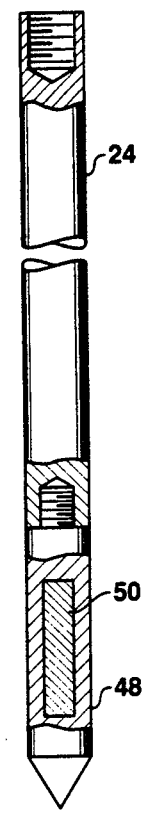

FIG. 6 is a representation of a geophone and spike combination in accordance with a third embodiment of the present invention.

Figure 7:
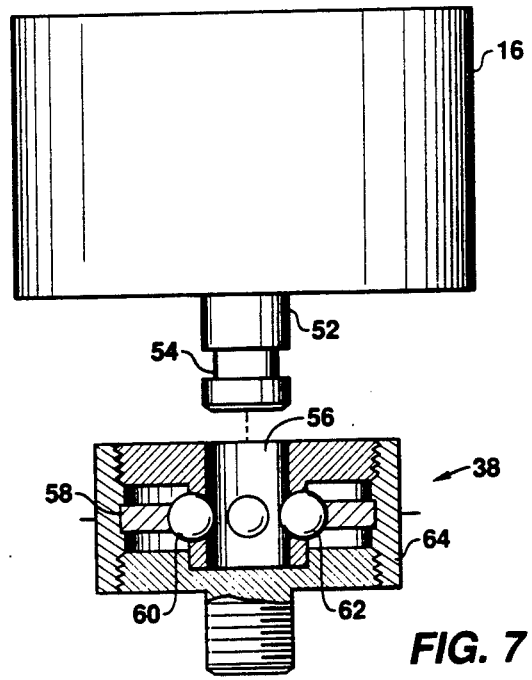

FIG. 7 is a representation of an alternate connection or coupling of a geophone with a spike in accordance with the present invention.

DESCRIPTION OF THE PREFERRED EMBODIMENTS

Now referring to the drawings and first to FIG. 1, three alternative embodiments of the geophone-and-spike combinations are illustrated in a location of use. For convenience, embodiment 10 will sometimes be referred to herein as the "bow spring embodiment", embodiment 12 will sometimes be referred to as the "drill bit" embodiment and embodiment 14 will be referred to as the "weighted tip" embodiment.

Each of the embodiments of FIG. 1 comprises a geophone 16, a coupler 18 and a spike 20, 22 or 24. Geophone 16 can be any convenient geophone including one or more seismic receiving elements or components well-known in the art and included in a housing adaptable for connection to coupler 18 as hereafter described. A 4.5 Hz and 10 Hz vertical geophone manufactured by Mark Products, Inc. are suitable examples of operable geophones adaptable for use as described herein.

The responses of geophones buried at different depths to the first arrival, which is a refracted compressional or P wave, is shown in FIG. 2. As expected, the deepest geophone, in this case at 3 feet, receives the on-set of the signal first. The last to receive the signal is the shallowest, or in this case, the one on the surface.

FIG. 3 is a contrasting comparison of the comparable first arrivals at geophones in accordance with the present invention. Each respective geophone is connected to a spike of the length shown for the vertical scale of the drawing, such spikes also being especially designed in accordance with the spike design as hereafter described. The geophone with the longest spike is the first to detect the upwardly moving signal; however, the difference is not as pronounced because there is some response provided by the entire length of the spike, not just the lowest location or spike tip. On the other hand, the response appearance is much more uniform than the waveforms of FIG. 1.

The bow-spring embodiment is shown in FIG. 4. In this embodiment, a typical spike made of aluminum and 28 inches in length and $\frac{1}{4}$ inch in diameter is pointed at its bottom tip end 26. About an inch or so along the shaft of the spike above the place where the spike no longer tapers to a point, a plurality of metal screws 28 around the shaft are connected through the lower ends of respective bow springs 30. Typically, there are 2, 3 or 4 bow springs evenly spaced around the periphery of spike 20, although even one bow spring would constitute an operable embodiment. A like plurality of metal screws 32 are located around the shaft and are in holding connection through the upper ends of bow springs 30 and the spike shaft. A typical bow spring is 3 inches in length, although the length is not critical and can vary from that length considerably.

The upper end of spike 20 shown in FIG. 4 is axially internally screwed at threads 34 for receiving a mating screw post 36 depending from a coupler 38. Coupler 38 may merely be a block on the order of 1 inch in diameter having a threaded post 36 on its lower end and an internally threaded hole at its upper end. The block provides a gradual enlargement of the spike in size and is a convenient means for attaching an installation driving block 40 or later, geophone 16. Although only block 40 is shown, the housing of geophone 16 is substantially identical to block 40, each being provided with a threaded depending post 42 for screwing into an internally threaded hole 44 in block 38.

In use, first the length of spike 20 is chosen, which can be in the range between about 3 inches and 10 feet, although in the vast majority of the time the spike is between 10 inches and 5 feet and preferably between 2 feet and 3 feet. Coupler 38 is then screwed onto spike 20 and finally block 40 is screwed onto coupler 38. Then, the spike is driven into the ground until coupler 38 is flush to ground level or possibly just above. The soil into which such a spike is driven can be almost any soil that is not bed rock. Somewhat sandy soil is ideal.

As the spike is driven either manually or by machine means into the ground, the bow springs cause the hole to be gouged out to a diameter slightly larger than the diameter of the spike. If the diameter of the spike is ⅛ inch, the insertion of spike 20 creates a hole 46 that is slightly larger, for example, ½ inch. Although there may be some slight contact or loose or light coupling of spike 20 with hole 46, only the lower 3 inches, where the bow springs are located, is in hard or tight contact to the earth. Contacting a number at least on the order of 1000 grains of unloosened soil within a vertical distance of 2 inches is considered tight coupling contact.

FIG. 5 illustrates an alternate spike configuration to that shown in FIG. 4 and is known as the drill bit embodiment. The lower end of spike 22 is attached by conventional means to a drill bit, which may be an enlarged head 46 with cutting surfaces included thereon. The head is typically ½ inch in diameter compared with a 1/4 inch diameter spike 22. The top end of the spike is screw threaded in the manner of spike 20 for receiving a coupler in the same manner as for spike 20. An auger or equivalent drilling system is used to rotate the spike into the ground to the depth of the spike. The hole dug is again slightly larger than the diameter of the spike itself. Thus, the drill bit end only is in hard coupling contact with the soil while, at best, the region of the spike above the bit is only lightly coupled. After the spike is in position, the auger is disconnected and the geophone is connected to the coupler in the manner shown in FIG. 4. Note that no block 40 is used with the drill bit embodiment.

FIG. 6 shows the weighted tip embodiment. In this case, the lower end of the spike shaft includes an axial hole, internally threaded to receive a compatible axial screw post of steel tip 48. The diameters of tip 48 and the shaft of spike 24 are the same. Internally, tip 48 carries a load of lead 50. Overall, tip 48 is heavier than the shaft of spike 24, for example, on the order of 4 to 1, although any tip 48 that is heavier than the remainder of the spike is operable. A coupler 38 and block 40 is used with spike 24 in the same manner as previously described with respect to spike 20 of FIG. 4. However, since the diameter of spike 24 is uniform, the surface of the spike is coupled by way of surface contact with the soil throughout its entire length. However, the response of the structure shown in FIG. 6 to seismic signals is dominated by its heavy end segment or region. Thus, again the remainder of the spike is lightly coupled with respect to its end, although this time as a result of the relative weights rather than relative surface contact with the soil.

Now referring to FIG. 7 an alternate connection scheme for the geophone and coupler is shown. In this configuration, the housing of geophone 16' includes a depending post 52 having a groove 54 near its lower end. The diameter of its very end is the same diameter as the post above groove 54.

Coupler 38' includes an axial opening 56 for receiving post 52. Internally, an O-ring spring 58 urges ball bearings 60 and 62 radially through side wall gaps aligned therewith into opening 56. Thus, when post 52 is inserted into opening 56, the balls are pushed radially outwardly until groove 54 is aligned with the balls, at which time, the balls are pushed inwardly to lock the post in place. The force holding the coupling joint is based on the tension of the expanded O-ring. A force of 1-10 lbs. is adequate to conduct seismic signal, but the coupler can be snapped and unsnapped by hand, i.e. the force of a person pulling upwardly on the geophone. The coupler is conveniently assembled using a threaded jacket mating with matching threads of the coupler housing.

The ball-and-post coupling can employ a perfectly rounded groove 54 and compatible operational parts when employed with the bow spring and weighted tip embodiments. However, for the drill bit embodiment where the spike is driven into the ground by a rotation drive system, the groove must be either squared or oblong to allow for such drive rotation without spinning freely in place.

Although spikes have been described that couple either by contact with the soil over a region near the lower end of the spike compared with contact above such region or by the lower end being weighted to be substantially heavier than the remainder of the spike, it is possible to combine these features in a single embodiment. This may be done, for instance, by providing for lead filling of either the bow-spring embodiment or the drill bit embodiment.

The spikes are removed in the reverse manner of their installations. For the spikes that were inserted by pile driving, their respective geophones are removed and a pry tool is used to lift up underneath the coupler or other lip surface. Alternatively, such a spike may be removed by putting the block back on where the geophone was and lifting up on the block. The drill bit embodiment is removed by reinserting the auger and reverse driving the bit while exerting an upward lift on the spike.

While several embodiments have been described and illustrated and others have been discussed, it will be understood that the invention is not limited thereto, since many modifications may be made and will become apparent to those skilled in the art.

What is claimed is:

1. A geophone, comprising
   a seismic sensitive element for sensing elastic motion and converting the motion to an electrical signal,
   a housing for enclosing said seismic element, and
   an elongated spike attachable to said housing, said spike having a lower segment which includes a drill head larger in diameter than the diameter of the spike; and said spike being suitable to be driven into the ground and said spike further includes a means for predominantly coupling the lower segment of said spike with the ground while leaving relatively lightly coupled with the ground the remaining segment of said spike.

2. A geophone in accordance with claim 1, wherein at least more than one-half of the coupling is obtained by substantially less than one-half of the lower length of said spike.

3. A geophone in accordance with claim 2, wherein a length of at least two inches of said spike acoustically couples with the ground.

4. A geophone in accordance with claim 1, wherein the length of said spike is in the range between 3 inches and 10 feet.

5. A geophone in accordance with claim 4, wherein the length of said spike is in the range between 10 inches and 5 feet.

6. A geophone in accordance with claim 4, wherein the length of said spike is in the range between 2 and 3 feet.

7. A geophone in accordance with claim 1, wherein more than one-half of the mass of said spike is included in substantially less than one-half of the lower length of said spike.

8. A geophone in accordance with claim 7, wherein more than one-half of the mass of said spike is included in the lower 3 inches of the length of said spike.

9. A geophone in accordance with claim 1, and including a coupler providing a lip at the upper end thereof for accommodating a removal tool.

10. A geophone in accordance with claim 1, wherein said spike has a diameter within the range of one-quarter to one-half inch.

11. A geophone in accordance with claim 1, wherein the lower segment of said spike is removably attachable from said remaining segment of said spike.

12. A geophone in accordance with claim 1, wherein said lower segment of said spike is also heavier than the remaining portion.

13. A geophone, comprising
a seismic sensitive element for sensing elastic motion and converting the motion to an electrical signal,
a housing for enclosing said seismic sensitive element, and
an elongated spike attachable to said housing, said spike having a tapered lower segment and includes at least one bow spring attached to the spike at a location above said tapered lower segment, said spike being suitable to be driven into the ground and including means for predominantly coupling the lower segment of said spike with the ground while leaving relatively lightly coupled with the ground the remaining segment of said spike.

14. A geophone in accordance with claim 13, wherein said lower segment of said spike is also heavier than the remaining portion.

15. A geophone, comprising
a seismic sensitive element for sensing elastic motion and converting the motion to an electrical signal,
a housing for enclosing said seismic sensitive element, and
an elongated spike attachable to said housing, said spike having a lower segment which is a drill bit, and said spike suitable for being driven into the ground and including means for predominantly coupling the lower segment of said spike with the ground while leaving relatively lightly coupled with the ground the remaining segment of said spike.

16. A geophone, comprising
a seismic sensitive element for sensing elastic motion and converting the motion to an electrical signal,
a housing for enclosing said seismic sensitive element, and
an elongated spike attachable to said housing, said spike having a lower segment which is steel tipped and lead filled, and said spike suitable for being driven into the ground and including means for predominantly coupling the lower segment of said spike with the ground, wherein said lower segment is steel tipped and lead filled, while leaving relatively lightly coupled with the ground the remaining segment of said spike.

17. A geophone in accordance with claim 16, wherein said lower segment of said spike is also heavier than the remaining portion.

18. A geophone in accordance with claim 16, wherein more than one-half of the mass of said spike is included in substantially less than one-half of the lower length of said spike.

19. The method of coupling a geophone to the ground beneath the surface, comprising
using a spike that includes a lower segment that provides a hole larger in diameter than the diameter of the rest of the spike, capping the top of the spike with a block that can accept driving of the spike by pounding, driving the spike to a distance greater than three inches deep so that the bottom of said spike couples with the soil while the remainder of the spike remains substantially uncoupled, and
securely attaching a geophone such that its housing is secured to the exposed top of the spike to provide coupling of the spike with the housing.

* * * * *